S. Jaqua.
Rolling Car Wheel Tires.
N° 31,244.
Patented Jan. 29, 1861.

Witnesses
Inventor
S. Jaqua

UNITED STATES PATENT OFFICE.

S. JAQUA, OF PATERSON, NEW JERSEY.

MACHINE FOR ROLLING RAILWAY-TIRES.

Specification of Letters Patent No. 31,244, dated January 29, 1861.

*To all whom it may concern:*

Be it known that I, S. JAQUA, of Paterson, in the county of Passaic and State of New Jersey, have invented certain new and useful Improvements in Machines for Rolling Railroad-Tires; and I do hereby declare that the following is a full, clear, and exact description of the same, reference being had to the accompanying drawing, forming a part of this specification, in which—

Figure 1:
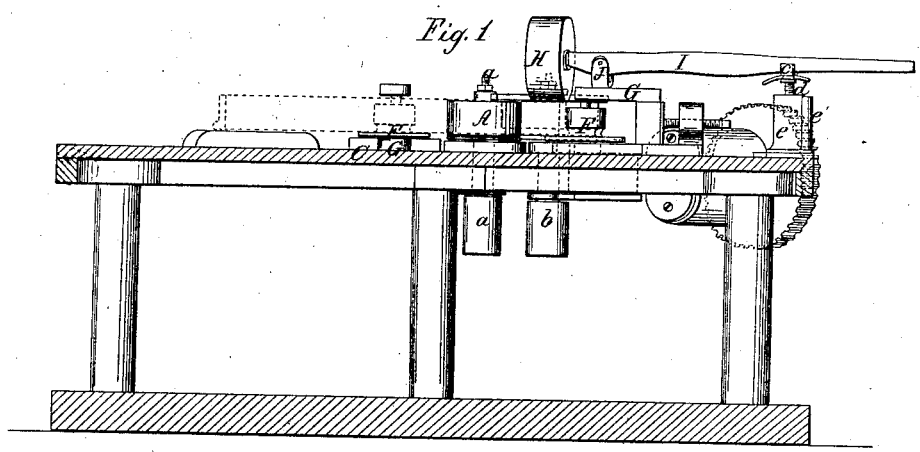
Figure 2:
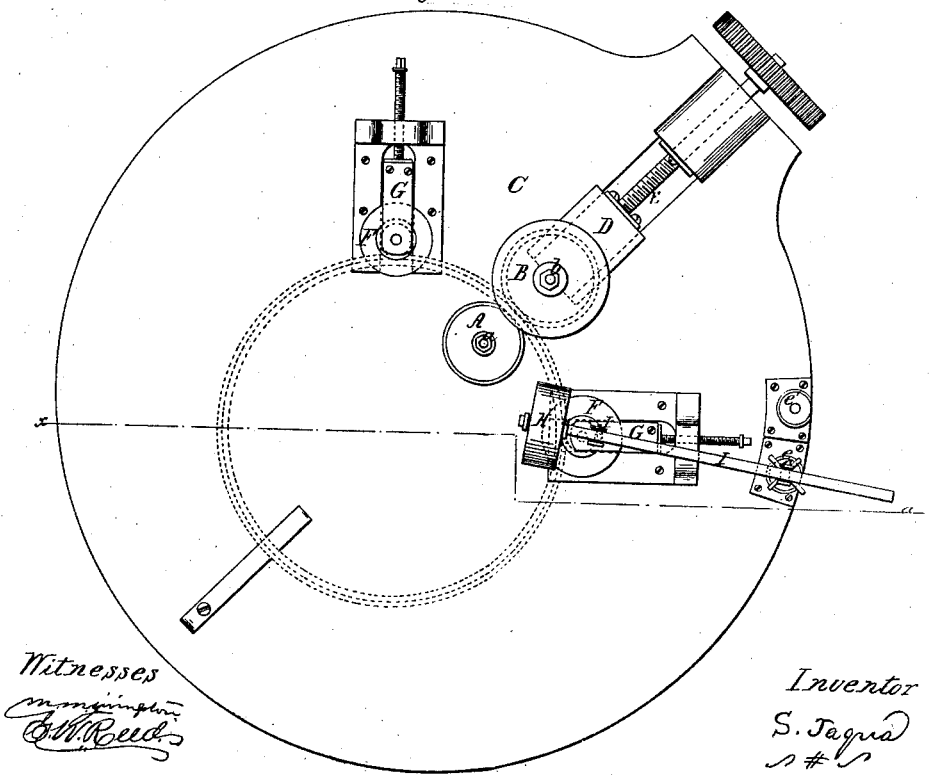

Figure 1 represents a transverse vertical section of my invention, taken in the plane indicated by the line $x$, $x$, Fig. 2. Fig. 2 is a plan or top view of the same.

Similar letters of reference in both views indicate corresponding parts.

With ordinary machines for rolling railroad tire, the iron is passed through between two rollers one plain and sharp cornered to act on the inside and one flanged and provided with a groove in its circumference close down to the lower flange, to act on the outside of the tire. This flanged roller is arranged in a sliding carriage which by means of a screw is forced up against the inner plain roller that is fastened to a vertical arbor having a rotary motion only. The width of the tire is determined altogether by the flanges of the outer roller, and the operation of forcing the iron through between said flanges causes much friction and a proportionate loss of power and at the same time said flanges wear out very quickly and the edges of the tires remain rough and uneven. To avoid these difficulties and to produce tire of uniform width all around and with smooth and well finished edges, is the object of this invention, which consists in the employment in combination with the ordinary pressing rollers, of a top roller acting on the edge of the tire previous to its passing through between the ordinary pressing rollers, said top roller being arranged on a lever or connected with some other similar device to produce the requisite pressure on the edge of the tire. The lever to which said top roller is attached, has its fulcrum in a swivel head which allows of adjusting said roller to the varying diameters of different tires, and flanged guide rollers serve to facilitate the motion of the tire, while the operation of rolling proceeds.

To enable those skilled in the art to make and use my invention, I will proceed to describe its construction and operation with reference to the drawing.

The pressing rollers A, B, are arranged on the table C, in the ordinary manner. The plain sharp cornered roller A, is secured to an arbor $a$, to which a rotary motion is imparted by suitable gearing and which has a stationary bearing in the table C. The double flanged roller B, on the other hand is secured to an arbor $b$, which has its bearing in the carriage D, and this carriage can be moved toward and from the roller A, by means of a screw E, to which a motion in the desired direction is imparted by a suitable gearing.

The tire passes through between the two pressing rollers as plainly shown in red outlines and the friction exerted by said rollers on the sides and edges of the tire causes the latter to move through between the rollers. Its motion on the table is facilitated by flanged rollers F which are arranged on the table C, having their bearings in sliding carriages G, which allow of adjusting said rollers F, according to the diameters of different tires.

In order to produce tires of uniform width and with smooth edges, the roller H, is made to act on the top edge of the tire, pressing the same down and facilitating its passage through between the flanges of the roller B.

The top roller H, is attached to the short arm of a lever I, that has its fulcrum in a swivel head J, which has its bearing in the top plate of one of the carriages G. The long arm of the lever I, rests on a fork $c$, which rotates freely on the top end of a jack screw $d$, so that by turning said screw in the proper direction the long arm of the lever I, is forced up and the top roller H, is forced down on the edge of the tire.

The jack screw $d$, screws into a post $e$, and its position can be changed from the post $e$, to the post $e'$, if it is desired to adjust the top roller to a tire of a larger diameter than the one shown in the drawing.

In changing the position of the jack screw and of the lever I, the swivel head J, will adjust itself according to the new position of the lever without difficulty.

The top roller H, acts directly over one of the flanged rollers F, and the friction of the tire itself causes said top roller and also the flanged rollers F, to assume a rotary motion.

By the action of the top roller H, the width of the tire is reduced so that the same passes through between the flanges of roller B, without an extra strain and at the same time the edges are rendered perfectly smooth and well finished.

Having thus fully described my invention what I claim as new and desire to secure by Letters Patent is:—

1. The employment of the roller H, lever I, swivel J and screw $d$ in combination with the rollers A, B in the manner and for the purpose substantially as herein shown and described.

2. The arrangement of the rollers F, F and adjustable carriages G, G with the rollers A, B, H as and for the purposes herein shown and described.

S. JAQUA.

Witnesses:
M. M. LIVINGSTON,
G. W. REED.